D. A. ZURBRIGG.
METHOD OF FORMING AND APPLYING TOOTH FACINGS.
APPLICATION FILED MAY 7, 1917.

1,265,022.

Patented May 7, 1918.

Inventor:
Daniel A. Zurbrigg

D. A. ZURBRIGG.
METHOD OF FORMING AND APPLYING TOOTH FACINGS.
APPLICATION FILED MAY 7, 1917.

1,265,022.

Patented May 7, 1918.
2 SHEETS—SHEET 2.

Witnesses
C. Reginald Culligan
John Powrs.

Inventor:
Daniel A. Zurbrigg
by Amos L. Norris,
Attorney

UNITED STATES PATENT OFFICE.

DANIEL ANTON ZURBRIGG, OF MILFORD, DELAWARE, ASSIGNOR TO THE L. D. CAULK COMPANY, OF MILFORD, DELAWARE, A CORPORATION OF DELAWARE.

METHOD OF FORMING AND APPLYING TOOTH-FACINGS.

1,265,022.   Specification of Letters Patent.   Patented May 7, 1918.

Application filed May 7, 1917. Serial No. 167,019.

*To all whom it may concern:*

Be it known that I, DANIEL ANTON ZURBRIGG, a subject of the King of Great Britain, residing at Milford, in the county of Sussex and State of Delaware, U. S. A., have invented certain new and useful Improvements in Methods of Forming and Applying Tooth-Facings, of which the following is a specification.

This invention relates to a method of forming and applying tooth facings, and is specially adapted to the original or restored application of tooth facings in bridges or dental structures having tooth backings similar to those of bridges.

The porcelain tooth facings frequently become broken from their backings, leaving the latter exposed and imposing the necessity of supplying a new tooth facing. Great care has to be exercised in the selection of the new facing in order to make sure that it matches the adjoining teeth in shade and that it is of the right size and shape relatively to said adjoining teeth. In many cases, the dentist, especially in the smaller centers, either because of the lack of a local supply store or because the local store cannot furnish the tooth required, must order it, by description, from a distant dealer. This causes delay and inconvenience to the patient without providing any compensating assurance that the tooth facing which the dealer furnishes will be satisfactory. Where the facings are constructed with a pair of pins for their attachment to the backing, the bridge must be removed or mutilated in order that the new facing may be fitted, a further element of delay, inconvenience and expense being thus introduced.

The present invention is addressed to the solution of the above difficulties; and its object is to provide a method of simple and facile character by which tooth facings of as good quality and finish as the ordinary porcelain teeth may, in all cases, be fitted quickly, certainly, accurately and without inconvenience and undue expense and which shall substantially eliminate liability of error in the selection of the shade and the determination of the form and size of the tooth. For the practice of the method cement such as is suitable for tooth restoration and a shallow facing matrix conforming in outline and size to the required tooth facing and in which the cement is molded are employed, the matrix being without oxidizing or chemical effect on the cement and being removable from the cement when set, without liability of deforming the molded tooth facing. The method presupposes the selection of the right shade of cement and of a facing matrix of the correct outline and size; and, with the stated object and advantages in view, consists, generally, in the filling of a matrix of the special structure referred to with the mixed cement, in the location of the matrix relatively to the backing and the adjoining teeth and the application of the cement, while plastic, to the tooth backing, under pressure exercised and maintained on the matrix, and in the removal of the matrix from the cement after the latter has set. When the matrix has been stripped, the excess cement at the margin of the restored tooth is removed and the tooth trimmed to give it the marginal outline and size best adapted for the particular tooth. As applied to bridges, the method effectively utilizes the anchorage means intended for ordinary porcelain facings.

The practice of the method is illustrated in the accompanying drawings, wherein:—

Fig. 1 shows the backing from which a tooth has been broken.

Fig. 2 shows the selection of the facing matrix.

Fig. 3 shows the preliminary trying of the facing matrix.

Fig. 4 shows the preliminary arrangement of a strip of celluloid under the backing to facilitate the packing or tamping of the cement.

Fig. 5 shows the application of the facing matrix and plastic cement to the backing.

Fig. 6 shows the matrix in position on the tooth when the cement has set.

Fig. 7 shows the tooth as finished, *i. e.*, with the matrix stripped, the excess cement removed and the margin trimmed and contoured.

Similar characters of reference designate corresponding parts throughout the several views.

The facing matrices (to which no claim is made in this application) are in the form of shallow depressions corresponding generally in outline and size to the tooth facing to be restored and provided with finger tabs for their manipulation. Said matrices are formed in blanks and are preferably of the construction which forms the subject of my co-pending application Serial No. 167,018.

Figure 1:
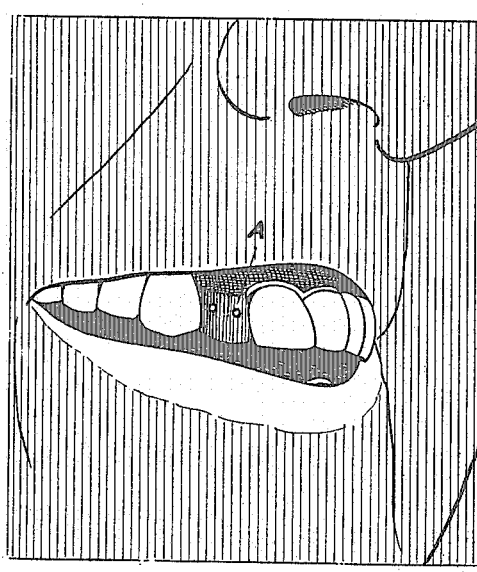

Fig. 1 shows a bridge from which the facing for the right lateral has become broken, leaving the backing A exposed. By way of example, this figure shows a construction which is well known wherein the bridge is adapted for porcelain facings having a pair of outwardly projecting anchorage pins B which are soldered to the bridge, the said pins being left in the bridge, as shown, when the facing becomes broken.

Figure 2:
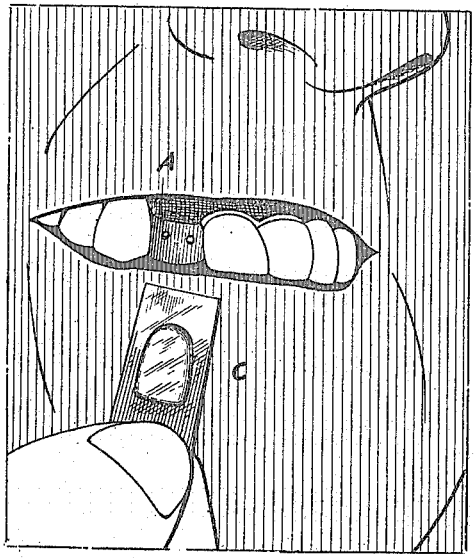
Figures 1 to 7 are views of the mouth.
Figure 3:
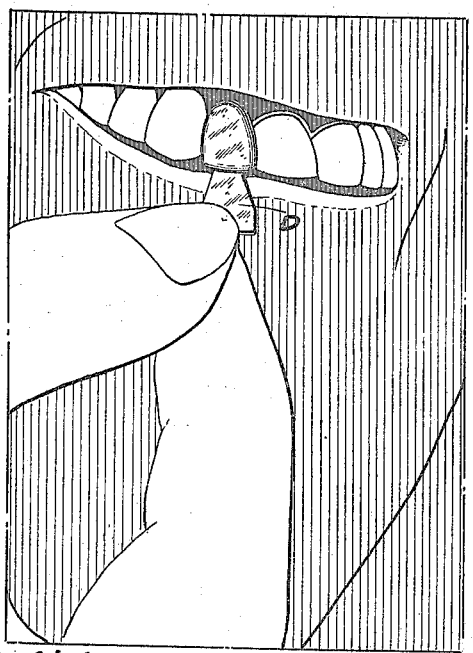

The dentist, relying on his skill and judgment, first selects a blank C (Fig. 9) having within its area a matrix suitable for forming a tooth facing to replace the missing one; and, as a matter of good or safe practice, verifies his selection by holding the matrix in proximity to the teeth adjoining the exposed backing A (Fig. 2). Being assured of having selected the proper matrix, the dentist next trims the matrix along its edges, (i. e. cuts the matrix from the blank C) leaving at its lower edge a finger tab D (Fig. 10) and then preliminarily "tries" the matrix over the exposed backing A (Fig. 3) in order to make sure that the outline and dimensions of the matrix are suitable for the formation and accurate fitting of the particular facing in view. This preliminary "trying" of the matrix will show whether it needs further trimming at any point or along any line and enable the preparation of the matrix for the cement.

Figure 4:
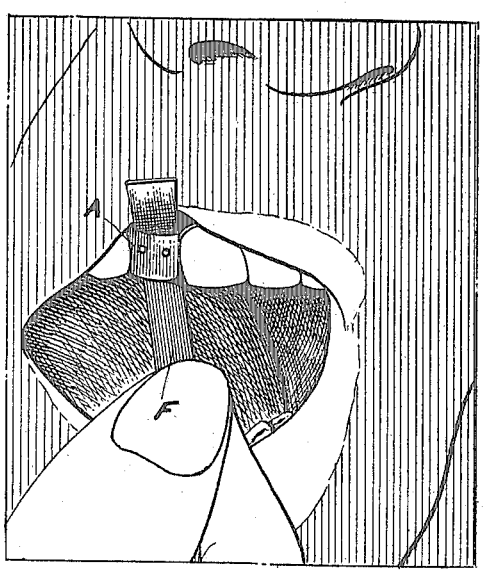
Figure 5:
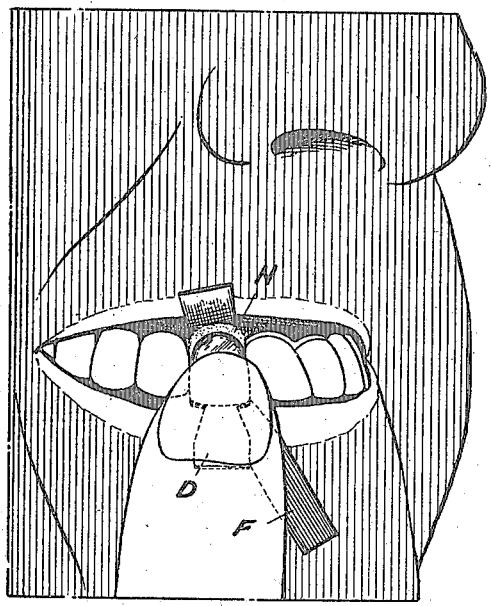
Figure 6:
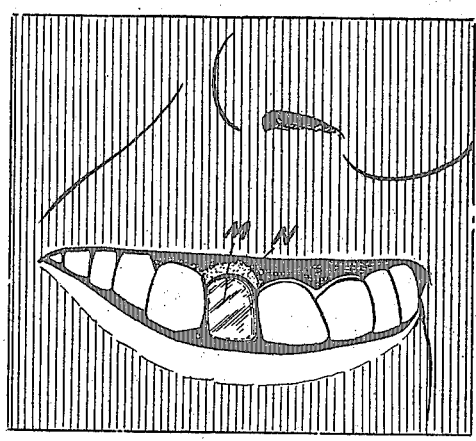
Figures 8, 9, 10:
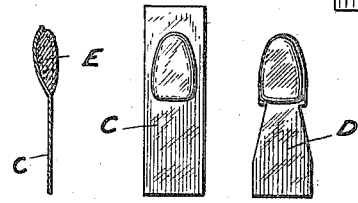
Fig. 8 is a sectional view showing the matrix filled with cement.
Fig. 9 is a view of the matrix untrimmed.
Fig. 10 is a view of the matrix trimmed or prepared.

Having completed the trimming of the matrix, the dentists fills it with cement E of the shade required to match the adjoining facings (Fig. 8). Having inserted a backing strip F, (Fig. 4) preferably of celluloid, under the bridge to a point beyond the lip line with a portion of said strip projecting from the mouth, the dentist next, by means of the matrix, applies the cement, while still plastic, to the bridge (Fig. 5). The cement is applied to the exposed face of the backing and the facing is properly located between the adjoining teeth by means of the matrix which, having the tab D, may be readily manipulated. It requires but a second or so to properly locate the facing and when this is done, suitable pressure is applied to the matrix by the thumb, being maintained until the cement has hardened (which takes place in two or three minutes). The thumb pressure on the matrix is effective to tamp or pack the cement against the backing A and the strip F, to insure the secure engagement of the cement with the anchorage pins B and to effect the accurate formation of the facing and its alinement with its neighbors. When the cement has set the strip F is removed and the tab D is cut from the matrix, the latter adhering to the molded tooth facing, as shown at M in Fig. 6.

Figure 7:
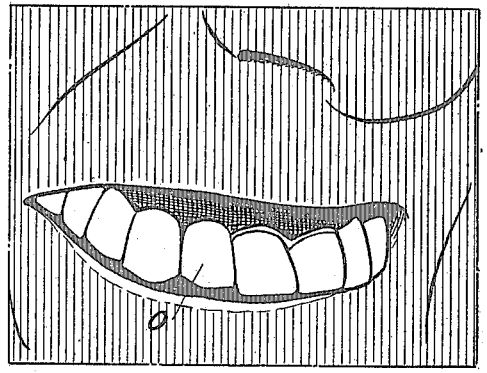

If desired, the matrix can be removed as soon as the cement has set but, as a matter of safe practice, it is preferably to allow it to remain on the tooth facing for one or two days and to remove it at a later appointment. The removal of the matrix is easily effected since the matrix may be readily peeled from the tooth facing. When the matrix has been peeled, the excess cement N (Fig. 6) is removed and the tooth is trimmed along its margin and otherwise contoured as may be necessary or desirable. The finished tooth O (Fig. 7) will match its neighbors in shade, size and general outline; will, therefore, be as effective in appearance as the original porcelain facing; will have as efficient anchorage with the bridge as the original porcelain facing; and will be substantially as lasting.

Figure 11:
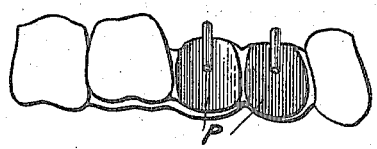
Fig. 11 is a view showing a bridge wherein the facings are secured by a vertical lug and two of the facings are missing.

Certain makes of porcelain teeth facings are recessed or undercut to take over outwardly projecting lugs which are soldered to and are parts of the bridge. When such facings become broken, the lugs Q are left on the bridge, as shown in Fig. 11 wherein P indicates the exposed backings of two broken facings. The present invention is applicable to the construction shown in Fig. 11, the practice of the method being as above described. In applying a cement tooth facing to the backings P the lugs Q (or similar attachments of like or other replaceable teeth or facings) are relied on as an anchorage means.

The invention has been described in connection with tooth facings to replace broken porcelain facings. It is to be understood, however, that cement facings made and applied in accordance with the invention may be used in the first instance where the backings are originally made with anchorage pins or lugs of any kind. While the invention will have its greatest utility and value as applied to the formation and fitting of tooth facings to bridges it will also be understood that the invention is applicable to the formation and fitting of tooth facings to backings generally where the backing is of the same general character and arrangement as in a bridge.

I claim—

1. A method of forming tooth facings and applying them to the backings of bridges or to similar backings, which involves the use of a matrix in the form of a shallow depression conforming in size and outline to the facing required, and which consists in filling the said matrix with cement suitable for tooth restoration; in locating the matrix and, with it, the cement contained therein relatively to the backing and the adjoining teeth to secure accurate alinement of the tooth facing and, by means of the matrix, applying the cement, while plastic, to the backing; and in maintaining pressure upon the matrix until the cement sets to effect the packing of the cement and its certain anchorage to the backing and to produce a molded tooth facing of the required form.

2. A method of forming tooth facings and applying them to the backings of bridges or to similar backings, which involves the use of a matrix in the form of a shallow depression conforming in size and outline to the facing required and which consists in filling the said matrix with cement suitable for tooth restoration; in locating the matrix and, with it, the cement contained therein relatively to the backing and the adjoining teeth to secure accurate alinement of the tooth facing and, by means of the matrix, applying the cement, while plastic, to the backing; in maintaining pressure upon the matrix until the cement sets to effect the packing of the cement and its certain anchorage to the backing and to produce a molded tooth facing of the required form; and, during the period in which pressure is exercised on the matrix in maintaining a backing strip under the backing.

In testimony whereof I have hereunto set my hand in presence of two subscribing witnesses.

DANIEL ANTON ZURBRIGG.

Witnesses:
W. G. SAMMONS,
W. S. DAUGHERTY.

Copies of this patent may be obtained for five cents each, by addressing the "Commissioner of Patents Washington, D. C."